United States Patent
Mittleman et al.

(10) Patent No.: US 8,729,414 B2
(45) Date of Patent: *May 20, 2014

(54) BUTTON ASSEMBLY WITH INVERTED DOME SWITCH

(71) Applicant: Apple Inc., Cupertino, CA (US)

(72) Inventors: Adam Duckworth Mittleman, Portola Valley, CA (US); Robert Scritzky, Sunnyvale, CA (US); Bradley Hamel, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 13/731,540

(22) Filed: Dec. 31, 2012

(65) Prior Publication Data

US 2013/0176695 A1  Jul. 11, 2013

Related U.S. Application Data

(63) Continuation of application No. 13/029,928, filed on Feb. 17, 2011, now Pat. No. 8,367,958, which is a continuation of application No. 12/113,910, filed on May 1, 2008, now Pat. No. 7,902,474.

(51) Int. Cl.
*H01H 1/10* (2006.01)
(52) U.S. Cl.
USPC .......................................... 200/516; 200/5 A
(58) Field of Classification Search
USPC ........................................................ 200/516
See application file for complete search history.

(56) References Cited

U.S. PATENT DOCUMENTS

| | | |
|---|---|---|
| 3,940,578 A | 2/1976 | Painton |
| 4,163,125 A | 7/1979 | Boulanger |
| 4,218,603 A | 8/1980 | Satoh |
| 4,307,268 A | 12/1981 | Harper |
| 4,817,950 A | 4/1989 | Goo |
| 5,138,119 A | 8/1992 | Demeo |
| 5,149,923 A | 9/1992 | Demeo |
| 5,510,782 A | 4/1996 | Norris et al. |
| 5,889,242 A | 3/1999 | Ishihara et al. |
| 6,100,484 A | 8/2000 | Houze et al. |
| 6,617,536 B2 | 9/2003 | Kawaguchi |
| 6,700,086 B2 | 3/2004 | Serizawa et al. |
| 6,713,692 B2 | 3/2004 | Yamasaki |
| 6,806,815 B1 | 10/2004 | Kaikuranta et al. |
| 6,841,748 B2 | 1/2005 | Serizawa et al. |
| 7,064,288 B2 | 6/2006 | Nam |
| 7,087,847 B2 | 8/2006 | Parkinson et al. |
| 7,094,985 B2 | 8/2006 | Kobayashi et al. |
| 7,619,176 B2 | 11/2009 | Yoshihiro |
| 7,902,474 B2 | 3/2011 | Mittleman et al. |
| 8,367,958 B2 * | 2/2013 | Mittleman et al. ............ 200/516 |
| 2009/0057121 A1 | 3/2009 | Yoshida et al. |

* cited by examiner

*Primary Examiner* — R S Luebke
*Assistant Examiner* — Lheiren Mae Caroc
(74) *Attorney, Agent, or Firm* — Brownstein Hyatt Farber Schreck, LLP

(57) ABSTRACT

A portable electronic device may have an inverted dome switch assembly. The switch assembly may have an inverted dome that has a base and a conductive underside. The base may be attached to a button member. Two electrical contacts in the button member may face the conductive underside. Corresponding conductive traces may be connected to the contacts. The dome may bear against a housing member. The button member may be movable with respect to the housing member from an unactuated position to an actuated position. The dome switch may form a footprint based upon the dome base area. The housing member may extend into a portion of the footprint and not into the remaining portion of the footprint allowing that space to be otherwise utilized.

19 Claims, 14 Drawing Sheets

BUTTON ASSEMBLY WITH INVERTED DOME SWITCH

CROSS-REFERENCE TO RELATED APPLICATIONS

This application is a continuation of U.S. patent application Ser. No. 13/029,928, filed Feb. 17, 2011, which is a continuation of U.S. patent application Ser. No. 12/113,910, filed May 1, 2008 (now U.S. Pat. No. 7,902,474), both of which are hereby incorporated by reference herein in their entirety.

BACKGROUND

This invention relates generally to electronic devices, and more particularly, to button assemblies for portable electronic devices such as handheld electronic devices.

Handheld electronic devices and other portable electronic devices are becoming increasingly popular. Examples of handheld devices include handheld computers, cellular telephones, media players, and hybrid devices that include the functionality of multiple devices of this type. Popular portable electronic devices that are somewhat larger than traditional handheld electronic devices include laptop computers and tablet computers.

Portable devices are small in size, so space is at a premium. Conventional components, such as conventional buttons based upon dome switches may consume relatively large amounts of real estate.

It would therefore be desirable to be able to provide an electronic device such as a portable electronic device with an improved button assembly that consumes minimal real estate.

SUMMARY

A portable electronic device such as a handheld electronic device is provided. The portable electronic device may have buttons. An inverted dome switch assembly may be used to provide a button with electronic switching capabilities. The dome switch may have a small internal footprint.

The inverted dome switch assembly may have an inverted dome with a base and a conductive underside. The base may be attached to a movable button member having two electrical contacts facing the conductive underside and corresponding conductive traces to those contacts. A compression structure, connected to housing, may be coupled to the apex on the remaining side of the inverted dome. The movable button member may reciprocate from an unactuated position to an actuated position with respect to the housing and the compression structure.

In the actuated position, the inverted dome may be compressed or collapsed and the conductive underside may come into contact with the electrical contacts. The two electrical contacts may be electrically connected to each other through the conductive underside of the inverted dome.

In the unactuated position, the inverted dome is in a relaxed position and the electrical contacts are electrically disconnected from one another. The dome switch may form a footprint having the area of the base. The footprint may have a first portion and a second portion. The compression structure, supporting the compression point or contact point between the compression structure and the remaining side of the dome switch, may extend into the first portion. Other unrelated electrical components may extend into the second portion or, alternatively, the unused space may be otherwise utilized.

Further features of the invention, its nature and various advantages will be more apparent from the accompanying drawings and the following detailed description of the preferred embodiments.

DETAILED DESCRIPTION

The present invention relates to dome switches. The dome switches may be used in button assemblies in electronic devices.

The electronic devices may be portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices.

If desired, the electronic devices may be, for example, handheld wireless devices such as cellular telephones, media players with wireless communications capabilities, handheld computers (also sometimes called personal digital assistants), remote controllers, global positioning system (GPS) devices, and handheld gaming devices. The electronic devices may also be hybrid devices that combine the functionality of multiple conventional devices. Examples of hybrid portable electronic devices include a cellular telephone that includes media player functionality, a gaming device that includes a wireless communications capability, a cellular telephone that includes game and email functions, and a portable device that receives email, supports mobile telephone calls, has music player functionality and supports web browsing. These are merely illustrative examples.

Figure 1:
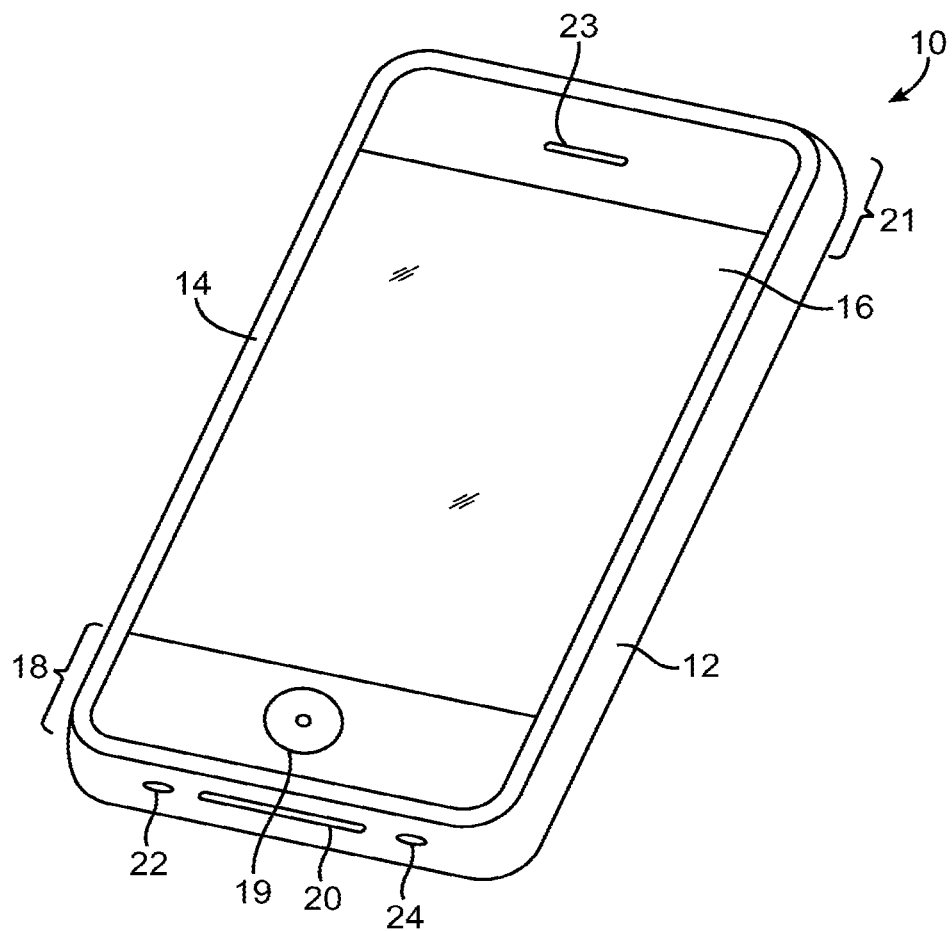
FIG. 1 is a perspective view of an illustrative portable electronic device in accordance with an embodiment of the present invention.

An illustrative portable electronic device in accordance with an embodiment of the present invention is shown in FIG. 1. Device 10 of FIG. 1 may be, for example, a handheld electronic device that supports 2G and/or 3G cellular telephone and data functions, global positioning system capabilities, and local wireless communications capabilities (e.g., IEEE 802.11 and Bluetooth®) and that supports handheld computing device functions such as internet browsing, email and calendar functions, games, music player functionality, etc.

Device 10 may have housing 12. Antennas for handling wireless communications may be housed within housing 12 (as an example).

Housing 12, which is sometimes referred to as a case, may be formed of any suitable materials including, plastic, glass, ceramics, metal, or other suitable materials, or a combination of these materials. In some situations, housing 12 or portions of housing 12 may be formed from a dielectric or other low-conductivity material. Housing 12 or portions of housing 12 may also be formed from conductive materials such as metal. An advantage of forming housing 12 from a dielectric material such as plastic is that this may help to reduce the overall weight of device 10 and may avoid potential interference with wireless operations.

Housing 12 may have a bezel, such as bezel 14. Bezel 14 may be formed from a conductive material and may serve to hold a display or other device with a planar surface in place on device 10 and/or to form an esthetically pleasing trim around the edge of device 10.

Display 16 may be a liquid crystal display (LCD), an organic light emitting diode (OLED) display, or any other suitable display. The outermost surface of display 16 may be formed from one or more plastic or glass layers. If desired, touch screen functionality may be integrated into display 16 or may be provided using a separate touch pad device. An advantage of integrating a touch screen into display 16 to make display 16 touch sensitive is that this type of arrangement can save space and reduce visual clutter.

Display screen 16 (e.g., a touch screen) is merely one example of an input-output device that may be used with electronic device 10. If desired, electronic device 10 may have other input-output devices. For example, electronic device 10 may have user input control devices such as button 19, and input-output components such as port 20 and one or more input-output jacks (e.g., for audio and/or video). Button 19 may be, for example, a menu button. Port 20 may contain a 30-pin data connector (as an example). Buttons, for some devices, are designed for receipt of a human finger. As such, it may be desirable for the buttons to have a design and size to receive a human finger or thumb. Openings 22 and 24 may, if desired, form speaker and microphone ports. Speaker port 22 may be used when operating device 10 in speakerphone mode. Opening 23 may also form a speaker port. For example, speaker port 23 may serve as a telephone receiver that is placed adjacent to a user's ear during operation. In the example of FIG. 1, display screen 16 is shown as being mounted on the front face of handheld electronic device 10, but display screen 16 may, if desired, be mounted on the rear face of handheld electronic device 10, on a side of device 10, on a flip-up portion of device 10 that is attached to a main body portion of device 10 by a hinge (for example), or using any other suitable mounting arrangement.

A user of electronic device 10 may supply input commands using user input interface devices such as button 19 and touch screen 16. Suitable user input interface devices for electronic device 10 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 10. Although shown schematically as being formed on the top face of electronic device 10 in the example of FIG. 1, buttons such as button 19 and other user input interface devices may generally be formed on any suitable portion of electronic device 10. For example, a button such as button 19 or other user interface control may be formed on the side of electronic device 10. Buttons and other user interface controls can also be located on the top face, rear face, or other portion of device 10. If desired, device 10 can be controlled remotely (e.g., using an infrared remote control, a radio-frequency remote control such as a Bluetooth® remote control, etc.).

Electronic device 10 may have ports such as port 20. Port 20, which may sometimes be referred to as a dock connector, 30-pin data port connector, input-output port, or bus connector, may be used as an input-output port (e.g., when connecting device 10 to a mating dock connected to a computer or other electronic device). Port 20 may contain pins for receiving data and power signals. Device 10 may also have audio and video jacks that allow device 10 to interface with external components.

Examples of locations in which antenna structures may be located in device 10 include region 18 and region 21. These are merely illustrative examples. Any suitable portion of device 10 may be used to house antenna structures for device 10 if desired.

Figure 2:
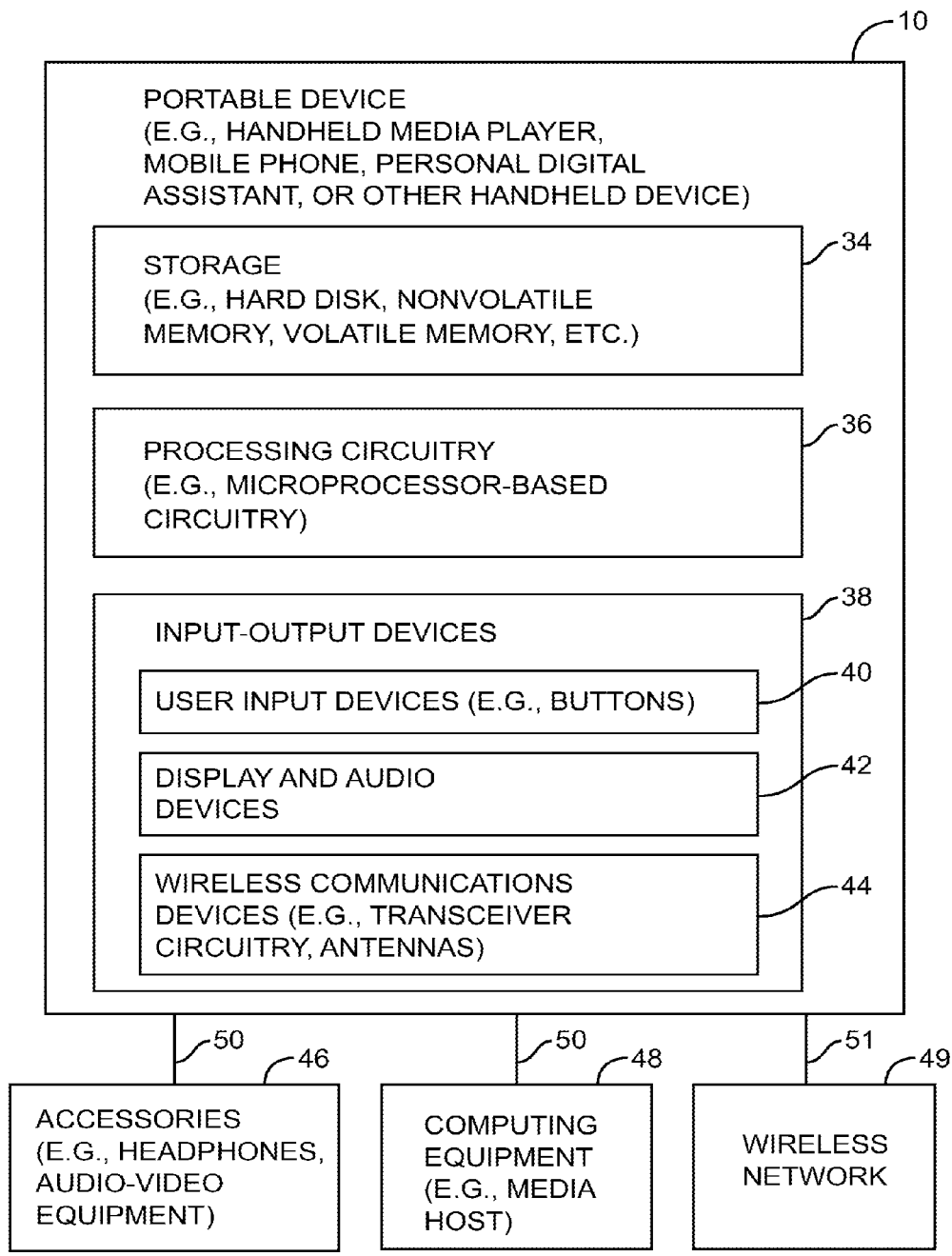
FIG. 2 is a schematic diagram of an illustrative portable electronic device in accordance with an embodiment of the present invention.

A schematic diagram of an embodiment of an illustrative portable electronic device such as a handheld electronic device is shown in FIG. 2. Portable device 10 may be a mobile telephone, a mobile telephone with media player capabilities, a handheld computer, a remote control, a game player, a global positioning system (GPS) device, a laptop computer, a tablet computer, an ultraportable computer, a hybrid device that includes the functionality of some or all of these devices, or any other suitable portable electronic device.

As shown in FIG. 2, device 10 may include storage 34. Storage 34 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 36 may be used to control the operation of device 10. Processing circuitry 36 may be based on a processor such as a microprocessor and other suitable integrated circuits. With one suitable arrangement, processing circuitry 36 and storage 34 are used to run software on device 10, such as internet browsing applications, voice-over-internet-protocol (VOIP) telephone call applications, email applications, media playback applications, operating system functions, etc. Processing circuitry 36 and storage 34 may be used in implementing suitable communications protocols. Communications protocols that may be implemented using processing circuitry 36 and storage 34 include internet protocols, wireless local area network protocols (e.g., IEEE 802.11 protocols—sometimes referred to as Wi-Fi®), protocols for other short-range wireless communications links such as the Bluetooth® protocol, protocols for handling 3 G communications services (e.g., using wide band code division multiple access techniques), 2G cellular telephone communications protocols, etc. To minimize power consumption, processing circuitry 36 may include power management circuitry to implement power management functions.

Input-output devices 38 may be used to allow data to be supplied to device 10 and to allow data to be provided from device 10 to external devices. Display screen 16, button 19, microphone port 24, speaker port 22, and dock connector port 20 are examples of input-output devices 38.

Input-output devices 38 can include user input-output devices 40 such as buttons, touch screens, joysticks, click wheels, scrolling wheels, touch pads, key pads, keyboards, microphones, cameras, etc. A user can control the operation of device 10 by supplying commands through user input devices 40. Display and audio devices 42 may include liquid-crystal display (LCD) screens or other screens, light-emitting diodes (LEDs), and other components that present visual information and status data. Display and audio devices 42 may also include audio equipment such as speakers and other devices for creating sound. Display and audio devices 42 may contain audio-video interface equipment such as jacks and other connectors for external headphones and monitors.

Wireless communications devices 44 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications).

Device 10 can communicate with external devices such as accessories 46, computing equipment 48, and wireless network 49 as shown by paths 50 and 51. Paths 50 may include wired and wireless paths. Path 51 may be a wireless path. Accessories 46 may include headphones (e.g., a wireless cellular headset or audio headphones) and audio-video equipment (e.g., wireless speakers, a game controller, or other equipment that receives and plays audio and video content), a peripheral such as a wireless printer or camera, etc.

Computing equipment 48 may be any suitable computer. With one suitable arrangement, computing equipment 48 is a computer that has an associated wireless access point (router) or an internal or external wireless card that establishes a wireless connection with device 10. The computer may be a server (e.g., an internet server), a local area network computer with or without internet access, a user's own personal computer, a peer device (e.g., another portable electronic device 10), or any other suitable computing equipment.

Wireless network 49 may include any suitable network equipment, such as cellular telephone base stations, cellular towers, wireless data networks, computers associated with wireless networks, etc.

The antenna structures and wireless communications devices of device 10 may support communications over any suitable wireless communications bands.

To facilitate manufacturing operations, device 10 may be formed from two intermediate assemblies, representing upper and lower portions of device 10. The upper or top portion of device 10 may sometimes be referred to as a tilt assembly. The lower or bottom may portion of device 10 may sometimes be referred to as a housing assembly.

The tilt and housing assemblies may each be formed from a number of smaller components. For example, the tilt assembly may be formed from components such as display 16 and an associated touch sensor. The housing assembly may include a plastic housing portion such as plastic housing portion 12 and printed circuit boards. Integrated circuits and other components may be mounted on the printed circuit boards. During manufacturing, one end of the tilt assembly may be inserted into the housing assembly. The tilt assembly may then be rotated ("tilted") into place so that the upper surface of the tilt assembly lies flush with the upper edges of the housing assembly.

Figure 3:
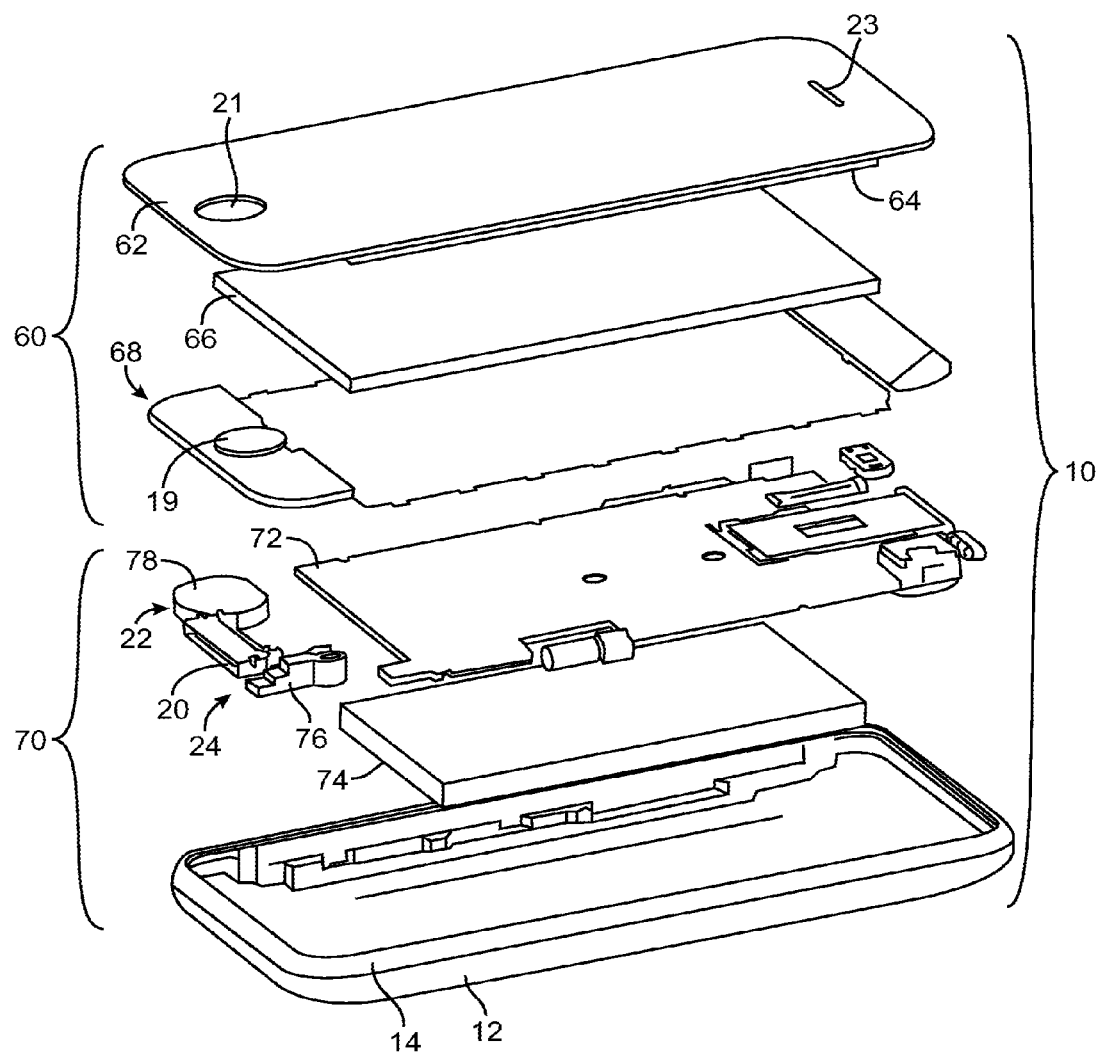
FIG. 3 is an exploded perspective view of an illustrative portable electronic device in accordance with an embodiment of the present invention.

An exploded perspective view showing illustrative components of device 10 is shown in FIG. 3.

Tilt assembly 60 (shown in its unassembled state in FIG. 3) may include components such as cover 62, touch sensitive sensor 64, display unit 66, and frame 68. Cover 62 may be formed of glass or other suitable transparent materials (e.g., plastic, combinations of one or more glasses and one or more plastics, etc.) and may have a button hole 21 for accessing a button 19 on frame 68. Display unit 66 may be, for example, a color liquid crystal display. Frame 68 may be formed from one or more pieces. With one suitable arrangement, frame 68 may include metal pieces to which plastic parts are connected using an overmolding process. If desired, frame 68 may be formed entirely from plastic or entirely from metal.

Housing assembly 70 (shown in its unassembled state in FIG. 3) may include a housing such as housing 12. Housing 12 may be formed of plastic and/or other materials such a metal (metal alloys). For example, housing 12 may be formed of plastic to which metal members are mounted using fasteners and/or a plastic overmolding process. Bezel 14 may be formed of plastic or other dielectric materials or may be formed from metal or other conductive materials. Housing assembly 70 may also include one or more printed circuit boards such as printed circuit board 72. Housing assembly 70 may also include components such as microphone 76 for microphone port 24, speaker 78 for speaker port 22, and dock connector 20, integrated circuits, a camera, ear speaker for port 23, audio jack, buttons, SIM card slot, etc.

A user of the device may provide input to the device by input devices such as button 19 or a touch screen. Button 19 is connected to frame 68 and may reciprocate within a button hole such as button hole 21 in cover 62. When depressed by a user, button contacts within the button are connected to each other and the button completes a circuit. When this condition is detected, an intended function may be performed by the device.

Dome switches are sometimes used in handheld devices. A dome switch has a bubble or "dome" with a conductive underside.

Figure 4:
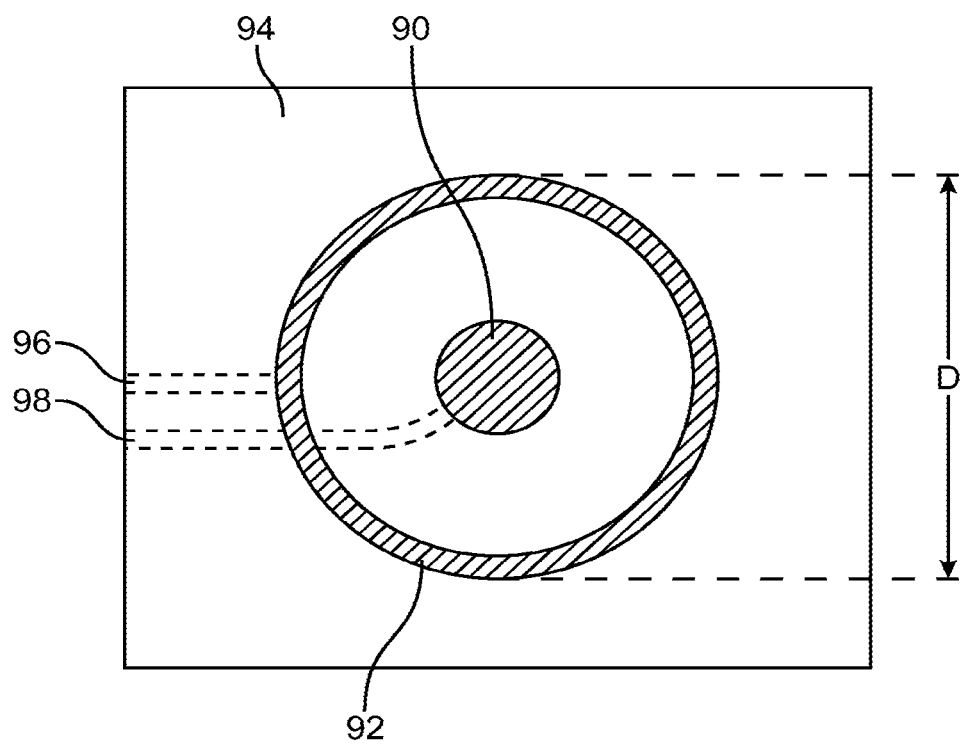
FIG. 4 is a top plan view of a landing pad having concentric contact rings in a conventional button assembly.

The dome is typically positioned over a "landing pad" on a printed circuit board substrate. FIG. 4 illustrates the landing pad on a printed circuit board of a conventional dome switch assembly. Printed circuit board 94 provides a landing pad area for the dome switch. Printed circuit board 94 has two traces: a first trace 96 that is connected to a dome switch contact such as fixed outer contact ring 92 and a second trace 98 that is connected to a second dome contact such as fixed center contact 90. Printed circuit board 94 mechanically supports and electrically connects first trace 96 with fixed outer contact ring 92 and second trace 98 with inner contact 90 using conductive traces.

In contrast to traces 96 and 98, which lie beneath or within the substrate of printed circuit board 94, fixed center contact 90 and fixed outer contact ring 92 are formed on the top of printed circuit board 94 and are exposed so that corresponding conductive material within the dome may come into contact with them. In an electrical sense, fixed center contact 90 and fixed outer contact ring 92 form an open circuit such that, when they are electrically connected, they complete the circuit (i.e., the switch is closed). Fixed center contact 90 and fixed outer contact ring 92 are typically made of gold.

The "landing pad" or strike zone of the conductive dome positioned over printed circuit board 94 has a footprint. That is, the conductive zone must cover the footprint in order to actuate the switch. In a system of the type described in FIG. 4, the conductive dome must cover both the inner contact ring 90 and the outer contact ring 92. As such, dome structures, in order to ensure contact and actuation, must cover the area of the circle defined by ring 92. A conventional dome structure is generally larger than ring 92 to provide space for the dome to be properly attached to board 94.

Figure 5:
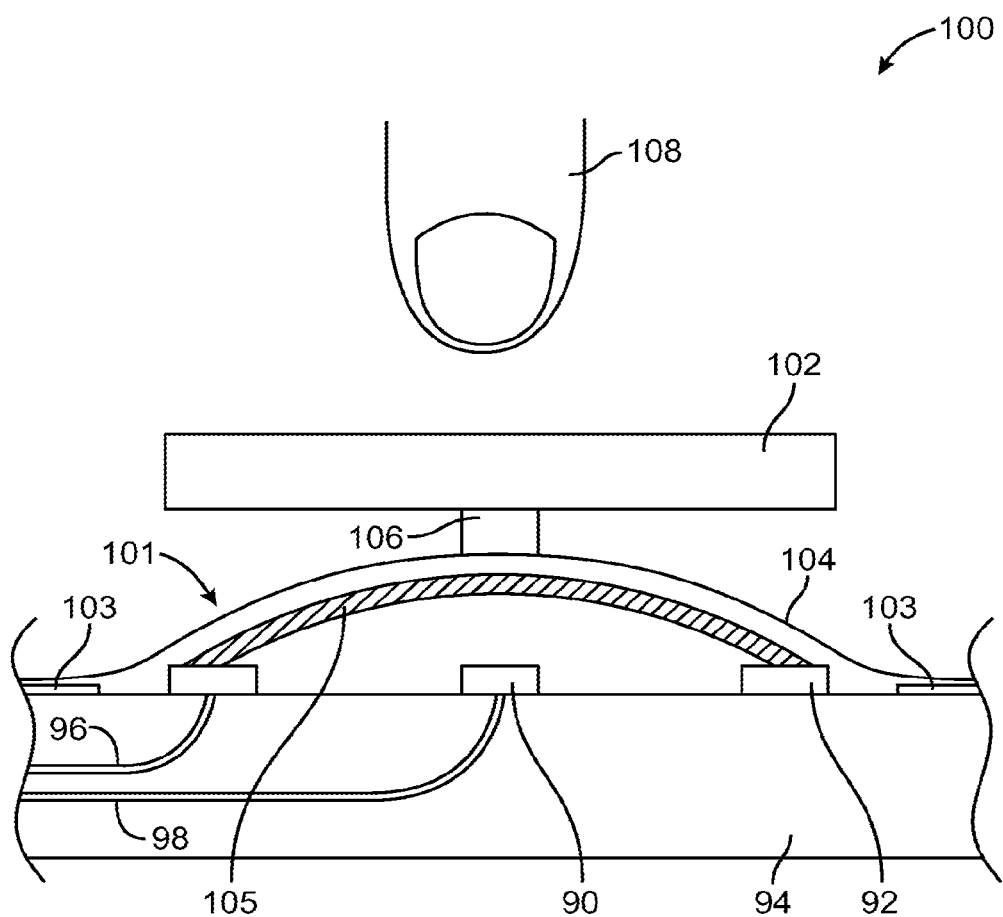
FIG. 5 is a schematic view of a conventional button assembly prior to its being actuated.

FIG. 5 is illustrative of a conventional dome switch in an unactuated or relaxed position. Conventional dome switch 100 has printed circuit board 94, copper traces 96 and 98, fixed center contact 90 and fixed outer contact ring 92 as discussed in connection with FIG. 4. Dome switch 100 further has a dome 101 made of polyethylene terephthalate ("PET") 104 with underlying adhesive 103 that connects dome 101 to printed circuit board 94. Dome 101 has an underside 105 coated with a conductive material such as graphite or gold. Around the perimeter of dome 101, conductive underside 105 is electrically connected to fixed outer contact ring 92 in the dome relaxed state. Dome switch 100 further has an associated button 102 for actuating switch 100 by finger 108. Button 102 may bear against dome 101 at contact structure 106.

Figure 6:
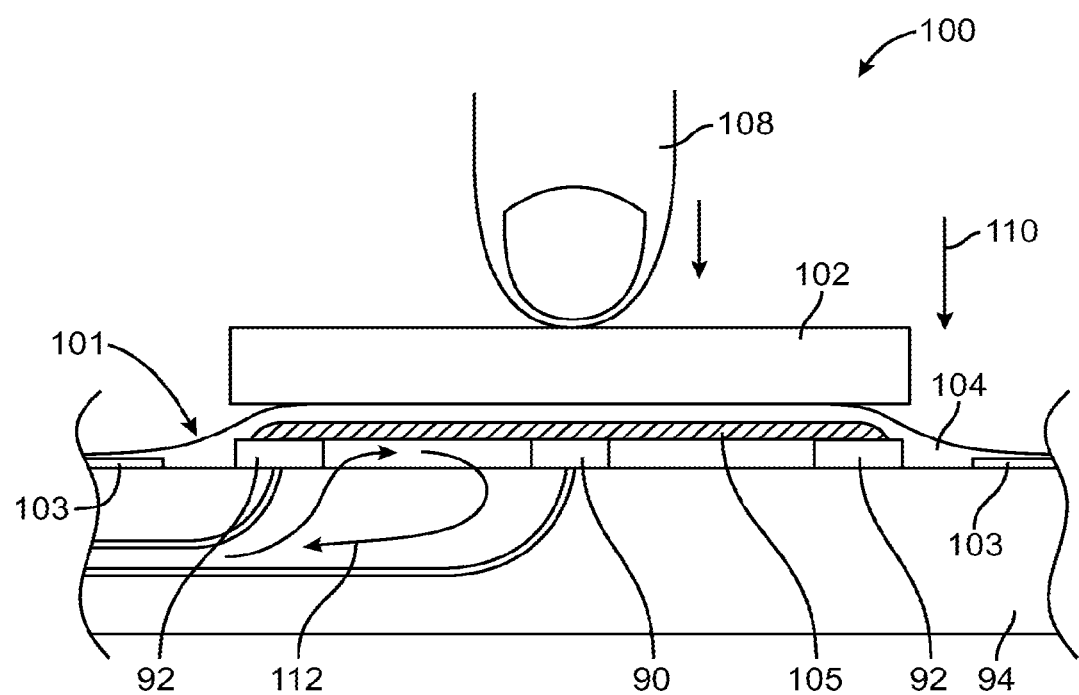
FIG. 6 is a schematic view of a conventional button assembly illustrating the button assembly after it has been actuated.

FIG. 6 is illustrative of dome switch 100 in an actuated or collapsed position. When button 102 is pushed downwardly as shown by arrow 110 by, for example, finger 108, dome 101 is compressed and collapsed. Conductive underside 105 comes into contact with fixed center contact 90 such that fixed center contact 90 and fixed outer contact ring 92 form completed circuit 112 through conductive underside 105, fixed center contact 90, and fixed outer contact ring 92, thereby closing the switch.

Conventional dome switch 100 consumes an area on printed circuit board 94 of at least $\pi r^2$, where r is the radius of ring 92. As such, area beneath the dome switch, which could be used otherwise to house electrical components such as resistors, capacitors, etc., is consumed by the landing pad for the dome switch.

Figure 7:
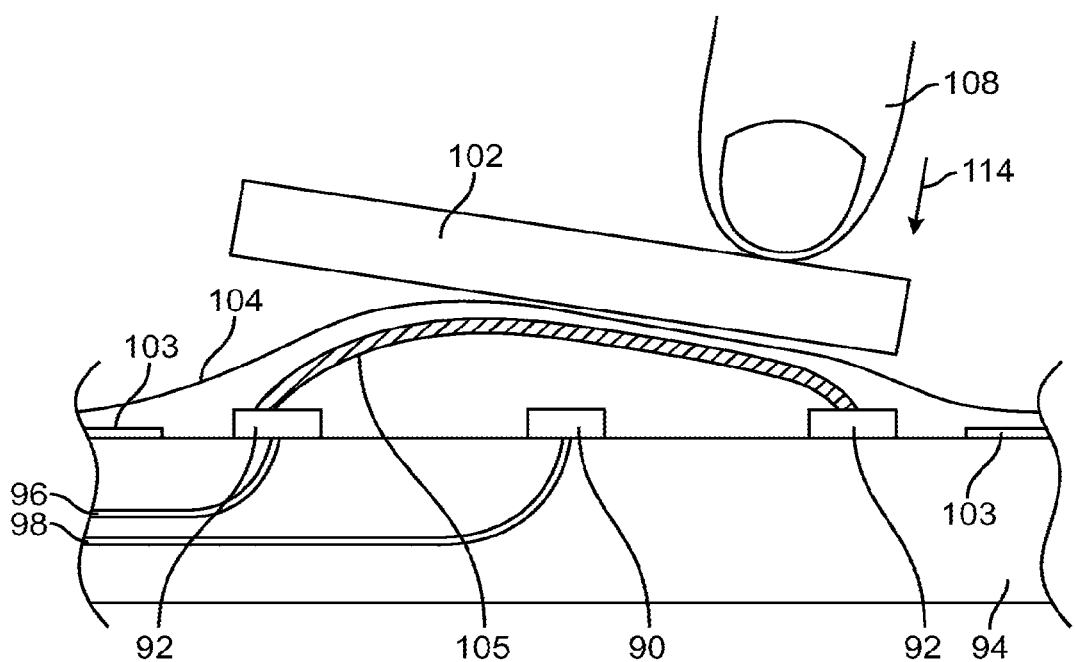
FIG. 7 is a schematic view of a conventional button assembly illustrating the button assembly having a mis-hit during an actuation attempt.

Another drawback of the conventional dome switch is that there is a risk that there may be a mis-strike on the button 102 as shown in FIG. 7. The off-center mis-strike by finger 108 as shown by arrow 114 may cause conductive underside 105 to miss fixed center contact 90 so that a connection is not established.

Figure 8:
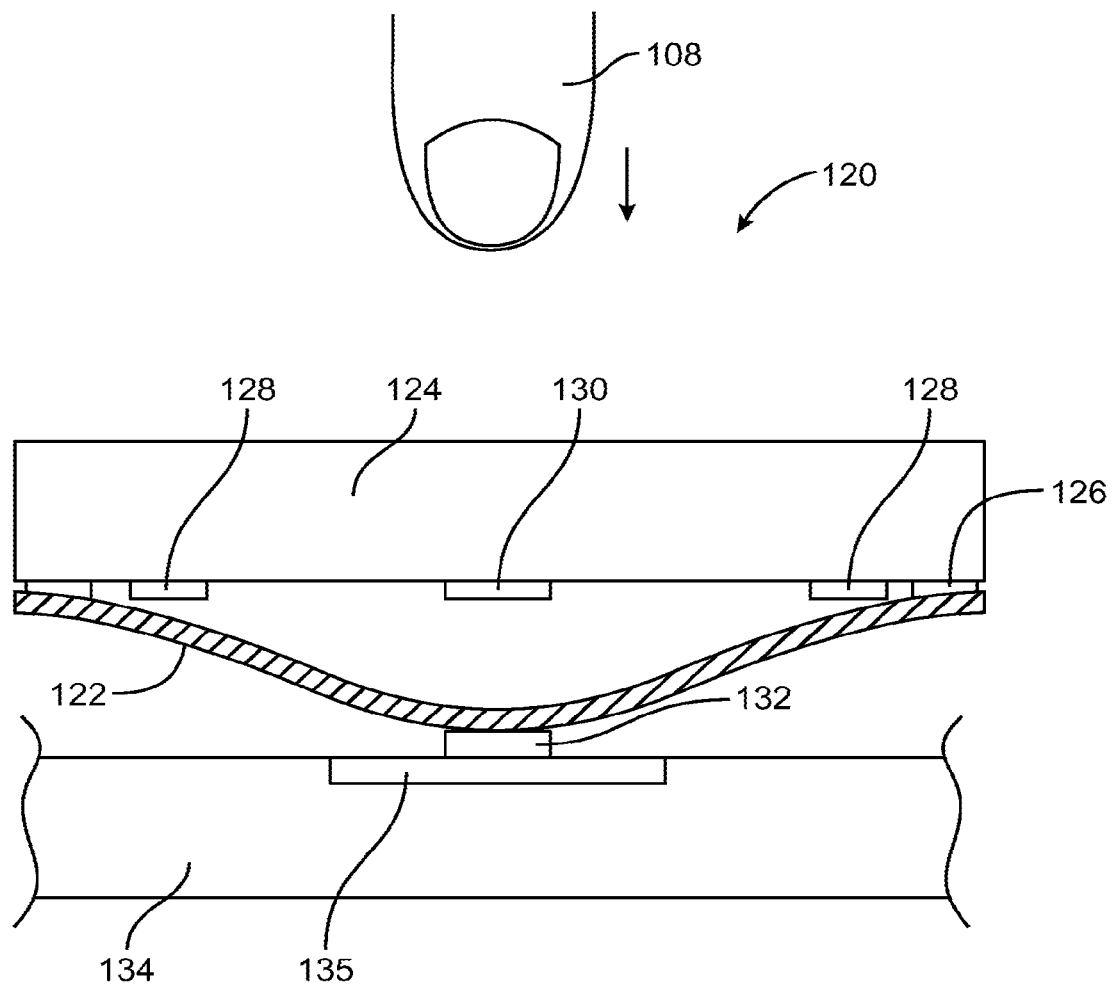
FIG. 8 is a schematic view of a button assembly having an inverted metal dome shown in its unactuated state in accordance with an embodiment of the present invention.

FIG. 8 is a schematic view of a dome button assembly in accordance with an embodiment of the present invention. Dome button assembly 120 may have a bubble or "dome" 122. Dome 122 may be in an inverted position with respect to a base member such as member 124 as compared to conventional dome switches. Dome 122 may be semispherical in shape having a base and an apex, or tip. The base of dome 122, attached to member 124, may be in the shape of a circle or any other suitable shape. Dome 122 may be made of a conductive material such as metal (e.g., gold) or any other suitable conductive, elastic material. The dome shape and material may provide the dome with elastic qualities so that, when compressed, it has the desired tactile response and does not surpass its yield point.

Dome 122 may be attached along its base or perimeter to member 124 by adhesive 126. Member 124 may be formed from any suitable structures. For example, member 124 may be formed from flex circuit material (e.g., polyimide), a rigid circuit board material (e.g., epoxy), etc. Member 124 may be backed by plastic (e.g., a plastic button structure) to provide a mechanically sound structure that receives inverted dome 122 when it is compressed. Member 124 (with its optional rigid backing structures) may support and electrically connect dome button assembly components, i.e., an inner contact ring, an outer contact ring and the conductive material in inverted dome 122 using conductive pathways (traces) formed on the surfaces or interior of member 124. Adhesive 126 may be formed of any suitable adhesive material such as two-sided pressure sensitive adhesive film (double sided tape), an adhesive without film backing, etc.

At its tip, or compression point, dome 122 may bear against a compression structure such as housing member 134. A member 132 such as an epoxy member may be attached to dome 122 and may help define a robust contact surface for the dome switch. Member 134 may be a housing member such as a frame structure, a housing wall, a printed circuit board or any other member in device 10 that can provide a structurally sound compression zone for dome 122. Positioned between housing member 134 and member 132 is shim 135. Shim 135 may be made of a metal such as stainless steel or any other suitable material. Shim 135 provides a hardened base for the compression zone for dome 122. Button member 124 may further have an inner contact such as inner contact pad or ring 130 and an outer contact such as outer contact ring 128. Many times, inner contact pad 130 and outer contact ring 128 may be made of gold but other metals may be used if desired. Inner contact pad 130 and outer contact ring 128 are electrically connected to the conductive traces of member 124 as shown schematically by dashed lines 154 and 156.

Dome button assembly 120 of the FIG. 8 is shown in an unactuated state in which inner contact pad 130 is electrically disconnected from outer contact ring 128. In the unactuated state, inner contact structure 130 and outer contact structure 128 form an open circuit in that the circuit having inner contact structure 130 and outer contact structure 128 lacks a complete path between a positive power source and ground. In the unactuated state, dome 122 is not collapsed.

Figure 9:
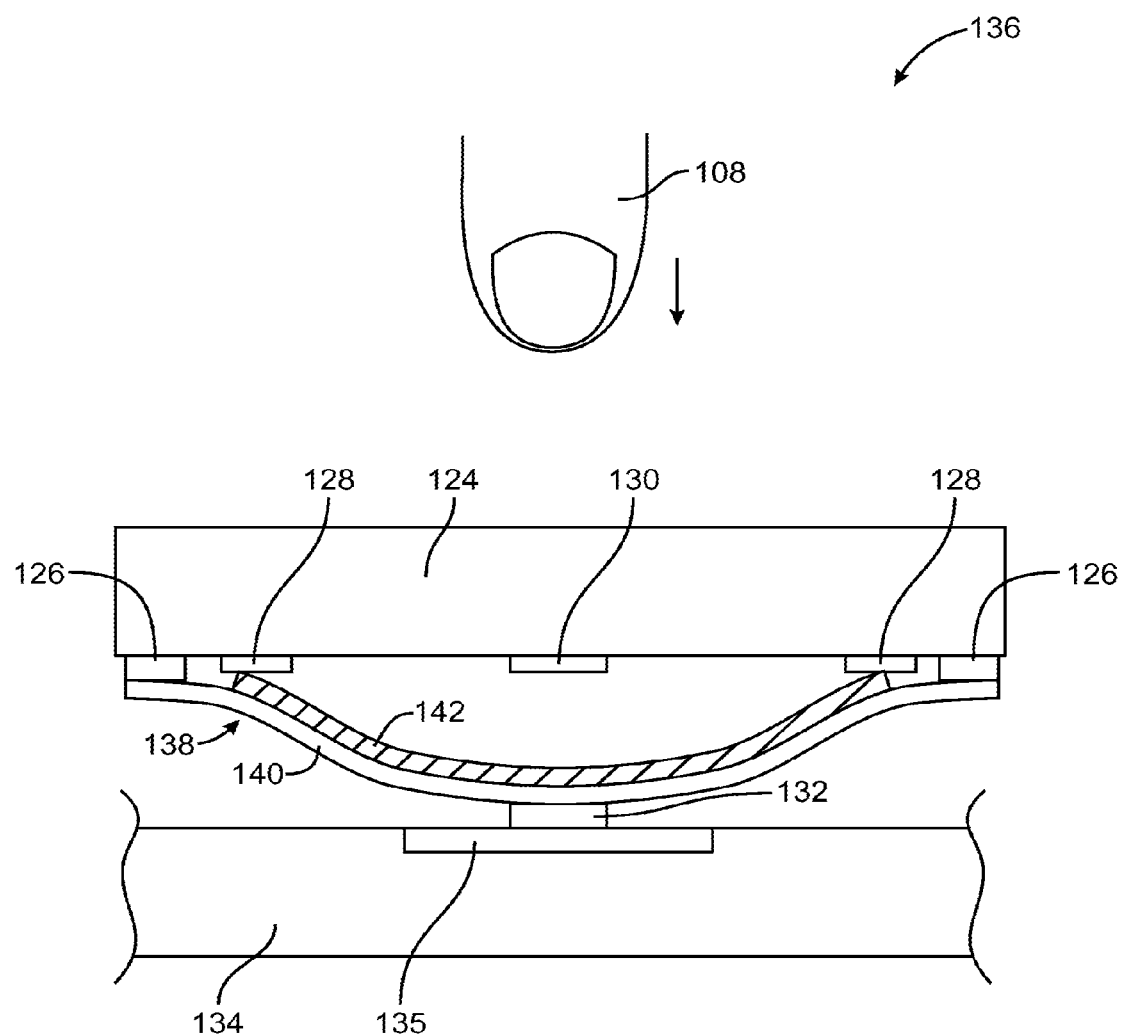
FIG. 9 is a schematic view of a button assembly having an inverted plastic dome with an interior metal coating shown in its unactuated state in accordance with an embodiment of the present invention.

Another illustrative embodiment of the dome button assembly is shown in FIG. 9. Dome button assembly 136 may have an inverted dome 138. Inverted dome 138 may have an outer skin such as outer member 140 made of rubber, a plastic such as polyethylene terephthalate ("PET") or any other suitable material. Inverted dome 138 may have an inner skin such as inner conductive member 142 (or underside) made of a conductive material. The conductive material may be gold or any other suitable conductive material and may be attached to the underside of outer member 140 with adhesive or any other suitable material. Alternatively, the conductive material may be applied by a coating process.

Dome 138 may be attached along its base to button member 124 by adhesive 126. Dome button assembly 136 of FIG. 9 is shown in an unactuated or relaxed state.

Figure 10:
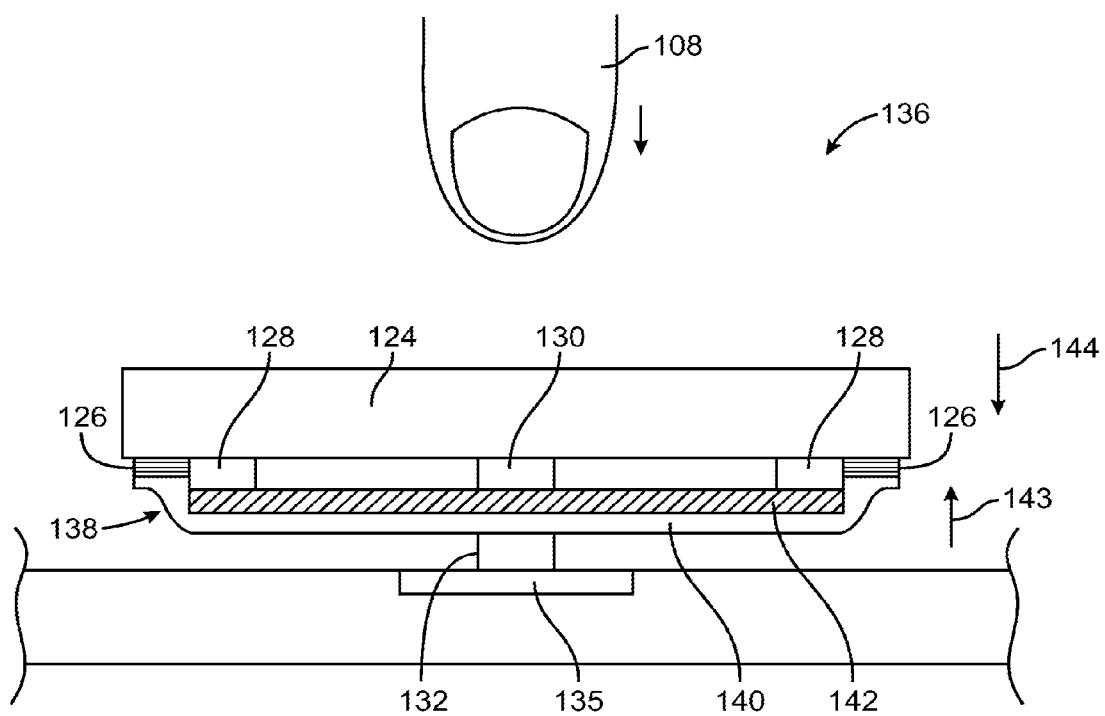
FIG. 10 is a schematic view of a button assembly having an inverted plastic dome with an interior metal coating shown in its actuated state in accordance with an embodiment of the present invention.

Dome button assembly 136 is shown in an actuated state in FIG. 10. As shown by direction arrow 144, when sufficient pressure is applied to button member 124 to overcome upward pressure from inverted dome 138 as shown by arrow 143, button member 124 moves in the direction of arrow 144. Inverted dome 138 may have spring-like qualities and may act like a compression spring that produces upward pressure 143. The movement of button member 124 in direction 144 applies pressure to inverted dome 138 along its base adjacent to button member 124 (or inverted landing pad) and at its tip (at member 132) at housing member 134 and shim 135, thereby collapsing inverted dome 138. When inverted dome 138 is in a collapsed state, inner conductive member 142 comes into contact with inner contact pad 130 and outer contact ring 128 on member 124. This completes the circuit and turns the switch or button to an "ON" state.

The provision of the inverted dome and the inverted landing pad allows housing member 134, which provides the compression point for the inverted dome, to be adjacent to only member 132, at the tip of the inverted dome in order to actuate the switch and not to the remainder of the footprint of the dome. By contrast, a conventional dome switch requires that a printed circuit board having inner and outer contact points as well as corresponding traces be sufficiently large in area to cover the entire footprint of the dome, so that the area in the footprint is dedicated for this purpose and cannot be used otherwise.

Figure 11:
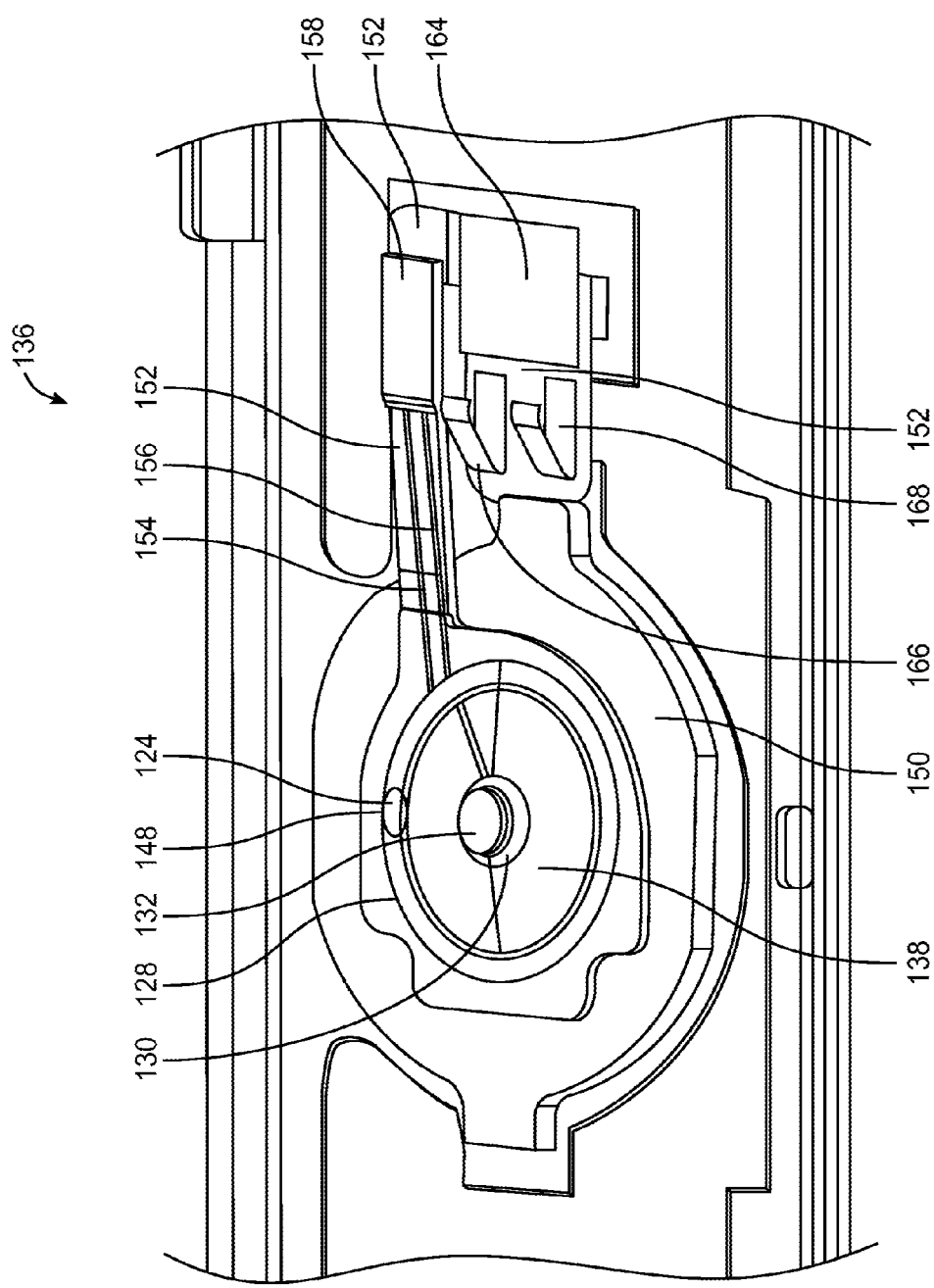
FIG. 11 is a bottom perspective view of button assembly having its housing member or compression structure not shown for clarity in accordance with an embodiment of the present invention.

FIG. 11 is a bottom perspective view of a button assembly in accordance with an embodiment of the present invention. Button assembly 136 is shown without member 134 for clarity. Dome button assembly 136 has inverted dome 138 attached to member 124 (shown through an air vent hole 148) using an adhesive or other suitable material. Inverted dome 138 may have an outer skin made of polyethylene terephthalate or any other suitable material and an inner skin made of a conductive material. Alternatively, the inverted dome may be made entirely of a conductive material such as a conductive metal (e.g., gold). Member 132 is shown attached to the tip of inverted dome 138. Inverted dome 138 has an air vent hole 148 that allows air to escape the underside of inverted dome 138 when the inverted dome is changing from a relaxed state to a collapsed state.

Member 124, which can be seen through air vent hole 148, has inner contact pad 130 and outer contact ring 128. The inner and outer contact pads may be concentric circles of conductive material such as copper or gold formed on the surface of member 124 facing the underside of inverted dome 138. Member 124 may be attached to button member 150 by adhesive or other suitable material.

Lower button member 150 provides structural support for member 124. Lower button member 150 receives button actuating energy transferred from external human finger contact, for example, and transfers this button actuating energy to member 124 which, in turn, uses this actuating energy to collapse inverted dome 138 to actuate dome button assembly 136. Button member 150 may be formed from one or more layers of plastic (in the shape of button 19) and may reciprocate within a hole formed in cover glass 62 such as hole 21, as shown in FIG. 3.

Member 124 may be formed from or connected to a flexible circuit such as flex circuit 152. Flex circuit 152 may include conductive traces formed in or on a flexible dielectric film. The flexible dielectric film may be made of polyimide or other suitable materials having satisfactory thermal stability, chemical resistance, and mechanical properties. In the dome button assembly shown in FIG. 11, traces 154 and 156 are formed within the flexible dielectric film. Traces 154 and 156 run from terminals 168 and 166 to member 124. Traces 154 and 156 continue on to inner contact ring 130 and outer contact ring 128 where holes may have been formed and contact pads may have been created so that the copper traces 154 and 156 may make electrical contact with outer contact ring 128 and inner contact pad 130.

Stiffeners, such as stiffeners 158 and 164 may be bonded to flex circuit 152 with a pressure sensitive adhesive or a thermal set adhesive or other suitable materials. Stiffeners 158 and 164 may enhance the strength of the flex circuit so that flex circuit 152 can bend (e.g., in the region between stiffener 158 and dome 138 as the button is depressed).

Spring contacts 166 and 168 are electrically connected to traces 154 and 156 and provide electrical connectivity to the switch. A printed circuit board with mating contact pads or other suitable structures may be connected to terminals 166 and 168. Spring contacts 166 and 168 may be made of beryllium copper or other suitable spring metals. If desired, the springs may be plated (e.g., with nickel). In FIG. 11, spring contacts 166 and 168 are shown in a relaxed state.

Figure 12:
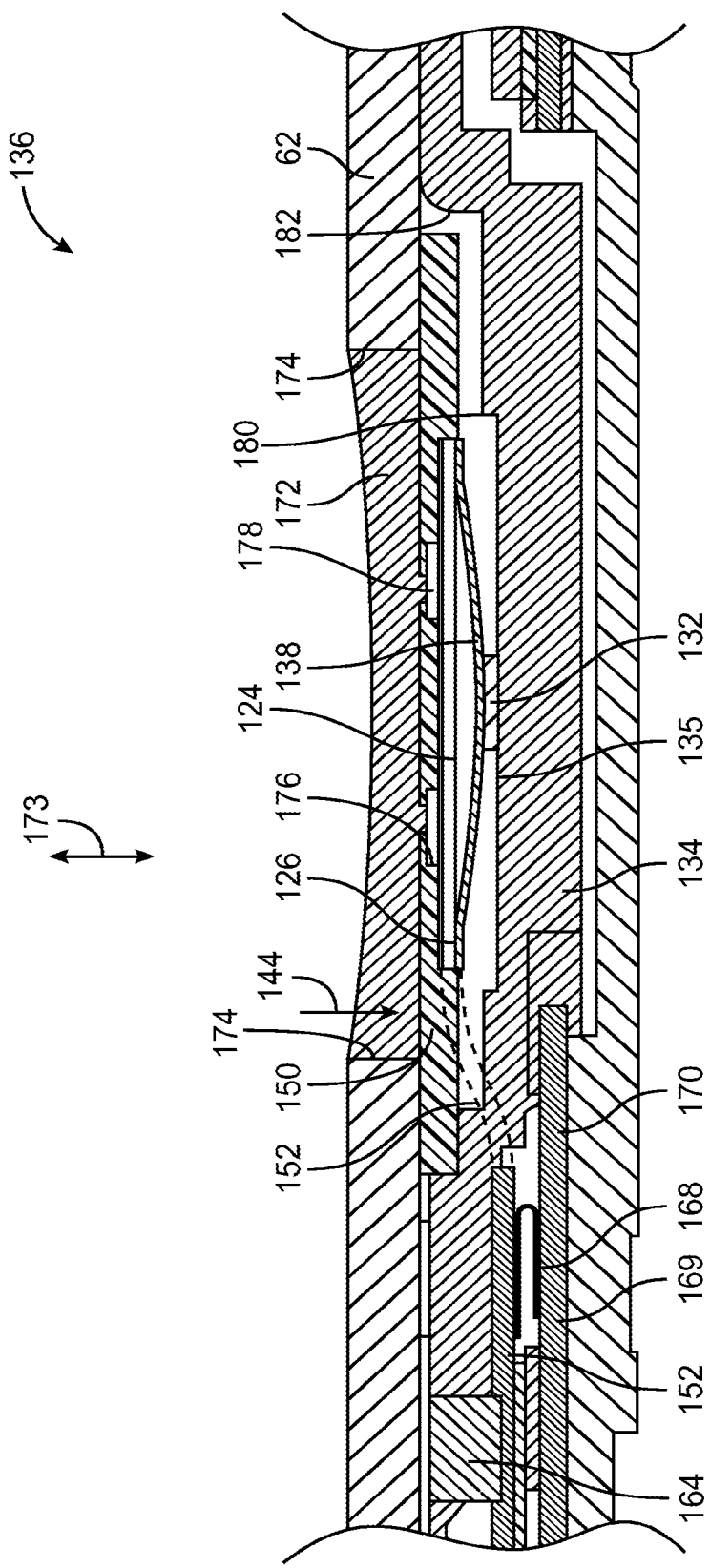
FIG. 12 is a side cross-sectional side view of a button assembly shown in its unactuated state in accordance with an embodiment of the present invention.

FIG. 12 is a cross-sectional side view of a button assembly shown in its unactuated or relaxed state. Dome button assembly 136 may have an inverted dome 138 with contact structure 132 that bears against shim 135 in housing member 134. Spring contact 168 (shown in a compressed state), along with spring contact 166 (not shown), provide compression spring force and electrical conductivity between second flex circuit 152 and pads 169 on printed circuit board 170. If desired, printed circuit board 170 may overlap a portion of the dome button footprint.

Dome button assembly 136 may have lower button member 150 (e.g., an opaque plastic member) attached to member 124. Assembly 136 may also have transparent upper button member 172 that is positioned within button opening 174 in cover 62. Cover 62 is typically made from glass but other suitable materials may be used. During operation, members 172 and 150 may reciprocate along axis 173 within hole 174. Lower button member 150 may have an opening 176 for holding a white patterned button portion 178. Portion 178 may form a white square when viewed from the front face of the device through transparent upper button member 172. The white color of portion 178 is typically formed from white ink. Upper and lower button members 172 and 150 may be formed using a two-shot plastic molding process. As transparent upper button member 172 and lower button member 150 reciprocate vertically within button opening 174, dome 138 is compressed and relaxed to operate the switch.

Housing member 134 may have a recess such as dome recess 180 that receives member 124 and dome 138 (when in a compressed state). Housing member 134 may also have a recess such as button recess 182 for receiving lower button member 150 when the button is depressed in direction 144.

Figure 13:
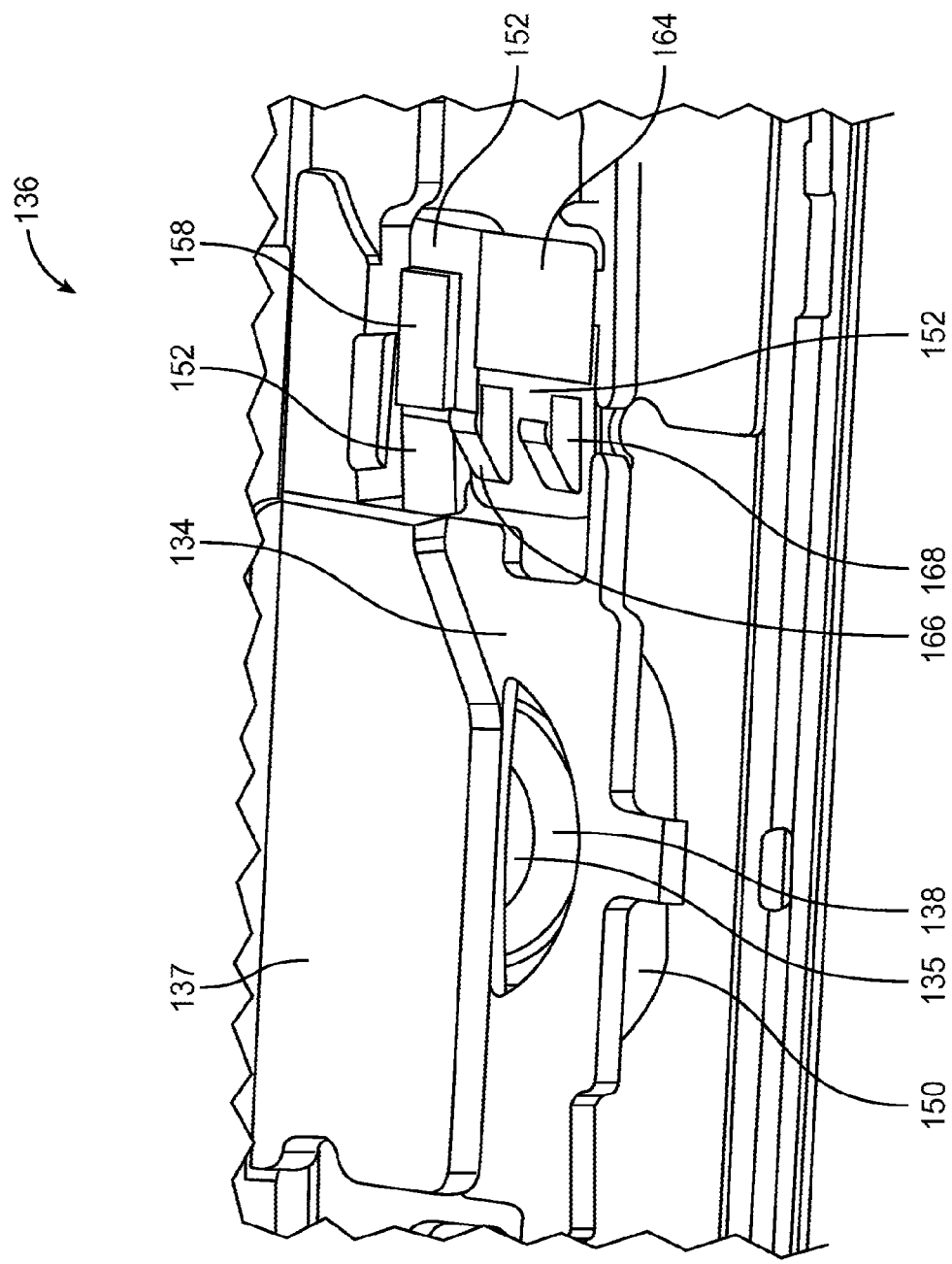
FIG. 13 is a bottom perspective view of a button assembly having its housing member or compression structure shown in accordance with an embodiment of the present invention.

FIG. 13 is a bottom perspective view of a button assembly 136 and housing member 134. Dome button assembly 136 has inverted dome 138 that bears against shim 135. Flex circuit 152 connects the inner and outer contacts of the dome top and spring contacts 166 and 168. As can be seen in the assembly of the type shown in FIG. 13, housing member 134 need not completely overlap the footprint of inverted dome 138. As a result, the space left where member 134 (and associated member 137) does not overlap dome 138 may be used for other structures.

Figure 14:
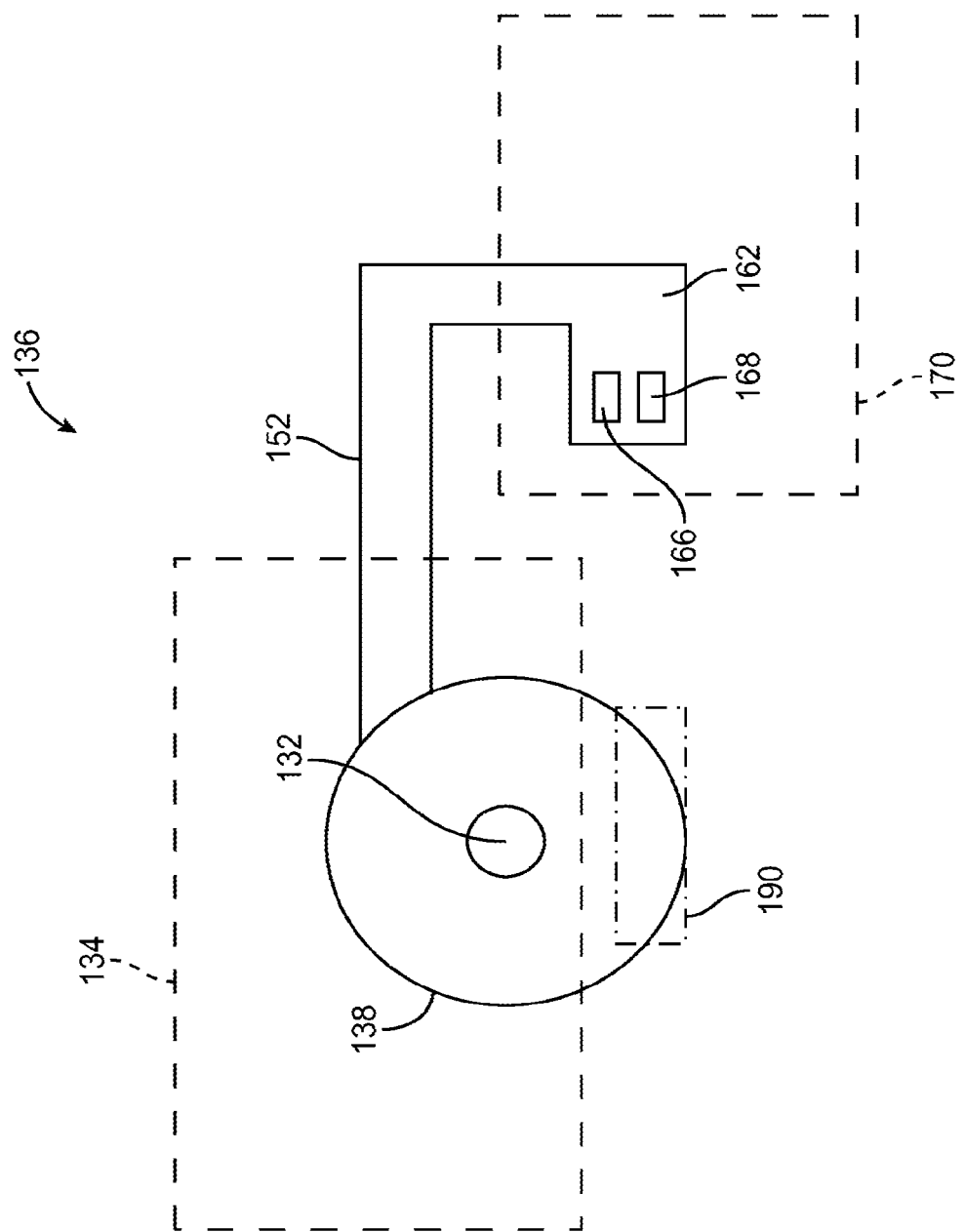
FIG. 14 is a top view of a button assembly illustrating a compression structure and additional components, each covering a portion of the dome button footprint, in accordance with an embodiment of the present invention.

FIG. 14 is a top plan view of a button assembly illustrating how housing member 134 may only partly overlap dome 138. Inverted dome 138 may have a compression point at member 132 that bears against overlapping housing member 134. Flex circuit 152 connects spring contacts 166 and 168 to the inner and outer contacts of the switch. Housing member 134 may overlap the tip of dome 138 at member 132, but need not extend over the remainder of the inverted dome footprint unless desired. As a result, internal area (as indicated by the dash-dot line 190) is available for use by other components, such as electrical components, printed circuit boards, flex circuits, wires, integrated circuits and other circuitry, cameras and other devices, etc. If desired, the saved space may be left unfilled to reduce the weight of device 10 and/or to provide room for parts to dissipate heat.

The foregoing is merely illustrative of the principles of this invention and various modifications can be made by those skilled in the art without departing from the scope and spirit of the invention.

What is claimed is:

1. An electronic device comprising:
a dome switch comprising first and second terminals and a collapsible dome that is movable between a relaxed state in which the first and second terminals are not electrically coupled and a collapsed state in which the dome electrically couples the first and second terminals;
a flex circuit comprising a flexible dielectric film and a plurality of conductive traces, wherein a first conductive trace of the plurality of conductive traces is electrically coupled to the first terminal;
a first spring contact member that is in physical contact with the first conductive trace, wherein the flex circuit comprises a first surface that faces the first and second terminals and a second surface to which the first spring contact member is attached; and
a circuit board comprising a first conductive pad, wherein the first spring contact member is positioned between the first conductive pad of the circuit board and the first conductive trace of the flex circuit in a compressed state.

2. The electronic device of claim 1, further comprising a button member that moves between an unactuated position and an actuated position, wherein the collapsible dome is movable between the relaxed state when the button member is placed in the unactuated position and the collapsed state when the button member is placed in the actuated position.

3. The electronic device of claim 1, wherein:
a second conductive trace of the plurality of conductive traces is electrically coupled to the second terminal;
the electronic device further comprises a second spring contact member that is in physical contact with the second conductive trace;
the second surface of the flex circuit is attached to the second spring contact member;
the circuit board further comprises a second conductive pad; and
the second spring contact member is positioned between the second conductive pad of the circuit board and the second conductive trace of the flex circuit in a compressed state.

4. An electronic device comprising:
a first housing member comprising a hole therethrough;
a button assembly comprising:
first and second electrical contacts;
a button member that moves within the hole between an unactuated position and an actuated position; and
a dome that is movable between a first state when the button member is in the unactuated position and a second state when the button member is in the actuated position, wherein the dome electrically couples the first and second electrical contacts when the dome is in the second state, and wherein the dome extends underneath a first area of the button member; and
a second housing member against which the dome presses when the button member is in the actuated position, wherein the second housing member extends underneath only a first portion of the first area of the button member.

5. The electronic device of claim 4, wherein only a first portion of the second housing member extends underneath the first portion of the first area of the button member.

6. The electronic device of claim 5, wherein a second portion of the second housing member does not extend underneath any portion of the first area of the button member.

7. The electronic device of claim 4, wherein the first area of the button member comprises the first and second electrical contacts.

8. The electronic device of claim 4, further comprising a display, wherein:
the first housing member comprises a display cover glass layer; and
the display cover glass layer comprises:
a first region through which the hole is formed; and
a second region that covers the display.

9. The electronic device of claim 8, wherein the hole comprises a sole menu button hole that is formed in the display cover glass layer.

10. The electronic device of claim 8, wherein:
the button member comprises:
an upper button member portion that is surrounded by the hole; and
a lower button member portion coupled to the upper button member portion; and
the lower button member portion extends beyond a cross-section of the hole.

11. The electronic device of claim 10, wherein:
the lower button member portion moves away from the display cover glass layer without bending when the button member is moved to the actuated position; and
the lower button member portion contacts the display cover glass layer when the button member is moved to the unactuated position.

12. The electronic device of claim 4, wherein the button member comprises a rigid portion that extends beyond a cross-section of the hole.

13. An electronic device comprising:
a first housing member comprising a hole therethrough;
a button assembly comprising:
a button member that moves within the hole between an unactuated position and an actuated position; and
a dome switch comprising:
first and second terminals; and
a dome that is movable between a first state when the button member is in the unactuated position and a second state in which the dome electrically couples the first and second terminals when the button member is in the actuated position, wherein the dome comprises an area defining a footprint for the dome switch; and
a second housing member comprising:
a first portion formed from a first material; and
a second portion formed from a second material against which the button assembly presses when the button member is in the actuated position, wherein
the second housing member overlaps only part of the footprint.

14. The electronic device of claim 13, wherein the second portion is embedded within the first portion.

15. The electronic device of claim 14, wherein:
the first material comprises plastic; and
the second material comprises a planar metal sheet.

16. The electronic device of claim 14, wherein the hole comprises a sole menu button hole that is formed in the display cover glass layer.

17. An electronic device comprising:
a display that outputs visual information;
a display cover glass layer comprising:

a first region comprising a hole extending therethrough; and a second region that covers the display; and a button assembly comprising:

a button member that reciprocates vertically within the hole between an unactuated position and an actuated position;

first and second terminals; and a dome that is movable between a first state when the button member is in the unactuated position and a second state in which the dome electrically couples the first and second terminals when the button member is in the actuated position.

18. The electronic device of claim 17, wherein:

the button member comprises:

a first portion that lies entirely within a cross-section of the hole; and a second portion that extends beyond the cross-section of the hole;

the display cover glass layer comprises an inner surface; and the second portion comprises a surface that bears against the inner surface of the display cover glass layer when the button member is in the unactuated position.

19. The electronic device of claim 18, wherein:

the first portion comprises an outer surface that receives externally applied button actuation pressure from a user; and the button actuation pressure moves the button member from the unactuated position to the actuated position.

* * * * *